United States Patent [19]
Hartwell et al.

[11] Patent Number: 4,914,692
[45] Date of Patent: Apr. 3, 1990

[54] AUTOMATIC SPEECH RECOGNITION USING ECHO CANCELLATION

[75] Inventors: Walter T. Hartwell, St. Charles; Mark A. Johnson, Wheaton, both of Ill.; Joseph Picone, Richardson, Tex.

[73] Assignee: AT&T Bell Laboratories, Murray Hill, N.J.

[21] Appl. No.: 138,984

[22] Filed: Dec. 29, 1987

[51] Int. Cl.⁴ .............................................. H04B 3/20
[52] U.S. Cl. ................................. 379/410; 370/32.1
[58] Field of Search ............... 379/406, 410, 411, 88, 379/89; 370/32, 32.1

[56] References Cited

U.S. PATENT DOCUMENTS 4,475,189 10/1984 Herr et al. ............................. 370/62
4,712,235 12/1987 Jones, Jr. .............................. 379/410

FOREIGN PATENT DOCUMENTS 0085662 5/1985 Japan ..................................... 379/88

OTHER PUBLICATIONS

"The AT&T Multi-Mode Voice Systems", Hester et al., Proceedings of the 1985 AVIOS Conference, Sep. 1985, pp. 1–10.
"New Benefits from Information and Communications Technologies", J. L. Flanagan, Ericsson Review No. 3, 1985, pp. 108–113.
"Conversant 1 Voice System: Architecture and Appl.", R. Purdue et al., AT&T Tech. Journal, vol. 65, No. 5, Sep./Oct. 1986, pp. 34–47.

Primary Examiner—Jin F. Ng
Assistant Examiner—Randall S. Vaas
Attorney, Agent, or Firm—John C. Moran

[57] ABSTRACT

A customer inquiry unit that allows the recognition of human speech in the presence of an initial prerecorded message transmitted by the customer inquiry unit via a telephone network. The customer inquiry system is designed to be utilized to respond to inquiries received via the telephone network. The system functions by responding to a telephone call received via the network to transmit an initial speech message to the customer. Due to a variety of network problems, a portion of the speech energy of the message is reflected back to the inquiry system. This reflected energy is commonly referred to as an echo. If the customer starts to speak before the inquiry system has finished the initial message, the system utilizes an echo canceler to remove the echo received back from the telephone network and only transfers the speech response to a recognition subsystem. The echo canceler adapts to the telephone network during the initial portion of the initial speech message before the customer can respond.

5 Claims, 2 Drawing Sheets

AUTOMATIC SPEECH RECOGNITION USING ECHO CANCELLATION

TECHNICAL FIELD

This invention relates to automatic speech recognition and in particular to the conditioning of a received signal to enhance recognition.

PROBLEM

An important application of automatic speech recognition is to allow total machine controlled response to customer inquiries made via the telephone system. One such system allows customer inquiries concerning railroad train schedules. In such a system, the customer uses an ordinary telephone to place the inquiry. The system responds to the inquiry by prompting the customer using an automatic speech synthesis subsystem and determines the customer's response using an automatic speech recognition subsystem. The problem in such a system is that the customer often begins to speak before the automatic speech synthesis subsystem has finished a prompt. In a normal telephone connection, there is an echo of the prompt back to the system, and the automatic speech recognition subsystem has difficulty in differentiating between the customer's spoken response and the echo resulting from the prompt.

SOLUTION

The foregoing problem is solved and a technical advance in the art is achieved by canceling the echo due to the prompt or message from an automatic speech synthesis subsystem before an automatic speech recognition subsystem attempts to recognize the customer's response. Advantageously, in order to facilitate the canceling, an echo canceler adapts to the communication media/telephone connection during a period of time before the customer begins speaking. By adapting to the connection before the customer begins speaking, the canceler can more accurately adjust to that connection. Also, that period of time is determined by assuming a predefined amount of time after the automatic speech synthesis subsystem starts the prompt.

DETAILED DESCRIPTION

Figure 1:
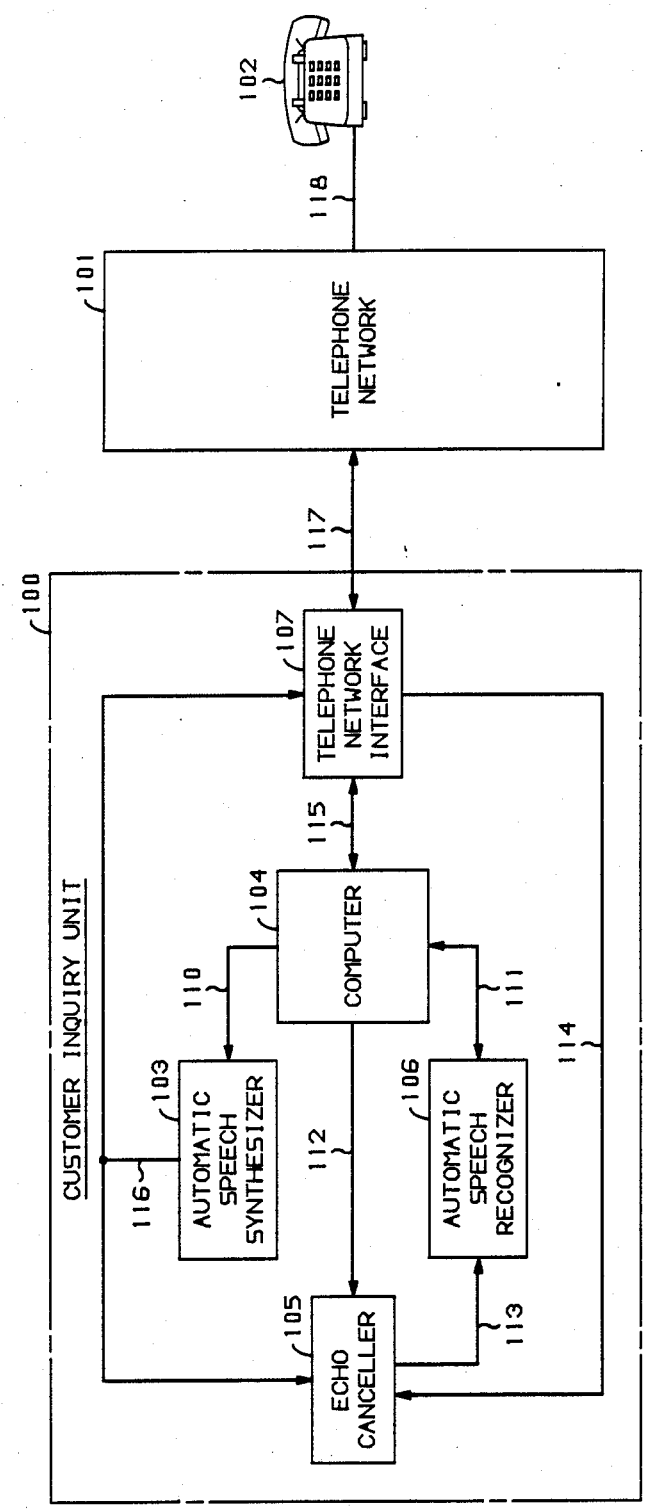
FIG. 1 illustrates, in block diagram form, a customer inquiry unit utilizing the present invention.

FIG. 1 illustrates the connection of customer inquiry unit 100 via cable 117 to telephne network 101. A customer wishing to access inquiry unit 100 utilizes a standard telephone such as telephone 102 and places a call via telephone line 118 and telephone network 101 to inquiry unit 100 via cable 117. Inquiry unit 100 responds to the customer's call by first transmitting an initial message or prompt to the customer informing the customer that the customer has reached inquiry unit 100. The inquiry unit 100 then asks the customer a series of questions and, in response to the customer's answers, provides the information that the customer is seeking. The customer's responses are simply spoken as in normal conversation. For example, inquiry unit 100 could store the railroad train schedules and provide this information for a particular train upon customer request.

When the inquiry unit 100 transmit a voice message to telephone network 101, often due to a variety of network problems, a portion of the speech energy is reflected back to the inquiry unit 100. The reflected energy is commonly referred to as an echo. If the customer starts to respond before the message from inquiry unit 100 is completed, then inquiry unit 100 must recognize the customer's response combined with the echo for the remaining portion of the speech message. Inquiry unit 100 eliminates the echo resulting from the message by utilizing echo canceler 105 before the automatic speech recognizer 106 attempts to recognize/decipher the customer's response. For a predefined amount of time, which advantageously may be one second, during the initial portion of each message, echo canceler 105 utilizes information from automatic speech synthesizer 103 received via path 116 and the echo signal received via cable 114 for automatically adapting to the echo for this particular telephone connection. Each telephone connection results in different echo characteristics due to line loading and other network conditions. The predefined period is short enough so that the customer cannot respond within that period of time.

Figure 2:
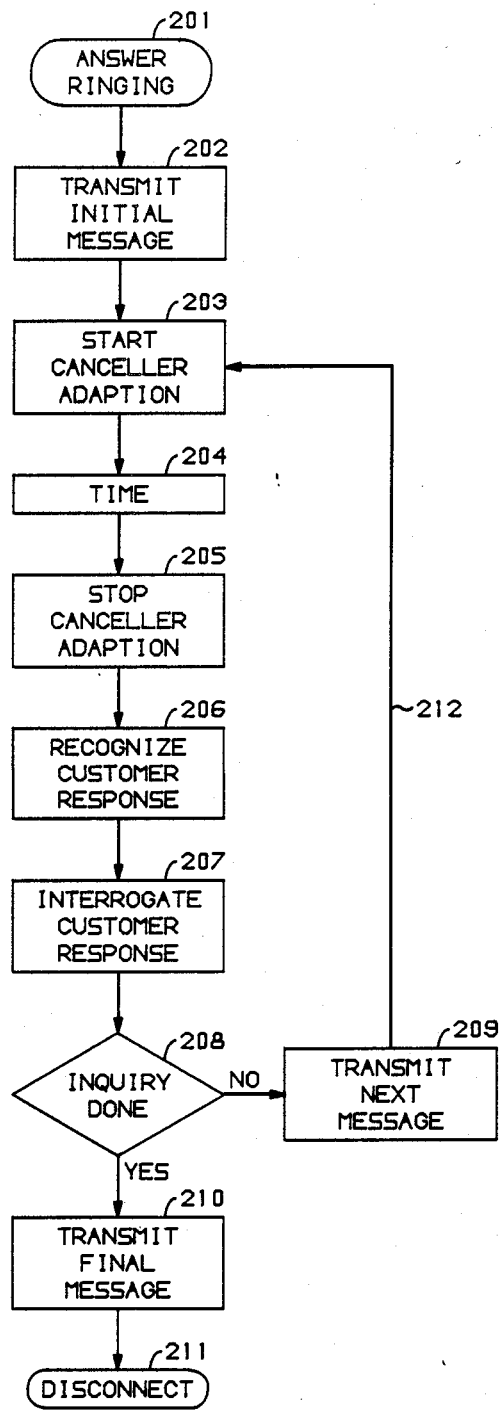
FIG. 2 illustrates, in flow chart form, a program executed by computer 104 of FIG. 1 to control the customer inquiry unit 100 in accordance with the present invention.

Consider now the operation of inquiry unit 100 in greater detail. Computer 104 controls the operation of inquiry unit 100. FIG. 2 illustrates in flow chart form the program executed by computer 104. In response to a signal from telephone network interface 107 indicating detection of a ringing, computer 104 transmits a signal via cable 115 enabling telephone network interface 107 to establish a telephone connection via cable 117 to telephone network 101 by executing instructions defined by block 201. Next, computer 104 executes program instructions defined by block 202 and actuates automatic speech synthesizer 103 via cable 110 to transmit the initial message to the customer via cable 116 and network interface 107. Then, computer 104 executes the program instructions defined by block 203 and actuates echo canceler 105 via cable 112 to respond to the message being transmitted by synthesizer 103 and the echo being received back via cable 114 to automatically adapt to the particular echo conditions on this network connection. Computer 104 then times for the predefined amount of time by executing the instructions defined by block 204. After execution of block 204, computer 104 executes the instructions defined by block 205 and tranmsmits via cable 112 a signal to echo canceler 105 to stop the echo adaptation.

Echo canceler 105 is responsive to the audio signal received via cable 114 which represents the combination of the customer's response and the echoed message being transmitted by synthesizer 103 to eliminate the echo and to transfer the customer's response to automatic speech recognizer 106 via cable 113. After the predefined amount of time has elapsed, computer 104 initiates recognizer 106 by execution of the code defined by block 206 to recognize the customer's response.

After recognizer 106 has performed operations to identify the words of the customer's response, recognizer 106 transfers this information to computer 104 via cable 111. In response to the latter information, computer 104 executes the program instructions defined by block 207 to determine the significance of the customer response. After execution of block 207, computer 104 executes block 208 to determine if the customer's inquiry is done based on the determination made in block 207. If the customer inquiry is not done, then the program instructions defined by block 209 are executed actuating synthesizer 103 to transmit the next message to the customer, and control is returned to block 203. If the customer inquiry is done, the program instructions defined by block 210 are executed actuating synthesizer 103 to have the final message transmitted to the customer which informs the customer that the inquiry is over. Then, block 211 is executed which causes information to be transmitted via cable 115 to network interface 107 to disconnect the inquiry unit 100 from telephone network 101 for this particular call.

Echo canceler 105 is implemented on a digital signal processor by executing the program illustrated in Appendix A. In addition to the digital signal processor, echo canceler 105 also comprises along-to-digital and digital-to-analog converters.

One skilled in the art would readily recognize the fact that both canceler 105 and speech recognizer 106 could be implemented using the same digital signal processor. In which case, path or cable 113 would simply be a buffer area in random access memory where the results of the program illustrated in Appendix A would be stored until the section of the program implementing recognizer 106 processed that information.

Appendix A

```
/*
 * Echo Canceller
 * external serial clocks
 * serial input dma
 * pc update is in 16 instr loop
 */
/*       filter order     */
/* must be multiple of 16    */
#define    ORDER128
/* adaptation delay (samples)*/
#define    ADAPT_DLY4000
#define    LOOP_CNTORDER / 16 - 2
/* # of samples in test file*/
#define    EOF16000

/*   code goes in ROM at 0x00*/ start:
/*  16 bit;ext ick,ock,ild,old*/
          ioc = 0x2887

/******************************************************/
/*Move dot product and FIFO subroutine to high memory.*/
/******************************************************/
          r1  = ldot0
          r2  = dodot
move:     r3h = *r1++
          nop
```

```
                *r2++ = r3h
                r1 - ldotl
                if(lt) goto move
                nop
                /**********************/
                /*Initialize variables */
                /**********************/
                r18  = 0
/*    point to output buffer*/
                r13  = lastout
                pin  = input
                /************************/
                /*   Load Reference Sample*/
                /************************/
mloop:          r1  = input
iloop:          pin - r1
                if(eq) goto iloop
                nop
/*    point to speech buffer*/
                r3  = spyloc
/*    move a sample to spyloc*/
                *r3 = a1 = float(*r1)
/******************************/
/*Compute the Estimate of      */
/*the Echo and Shift Input FIFO*/
/******************************/
chk:
/* call dot product in high mem*/
                goto dodot
                nop
/* dot product return location */
dotdone:
/*******************************************/
/*   Subtract Estimate from Near End Speech*/
/*******************************************/
t1:             r1  = near
nloop:          pin - r1
                if(eq) goto nloop
                nop
```

```
/* move near end speech to a1*/
t2:         a1 = float(*r1)

*r13 = a1 = a1 - a0
/* reset serial dma input ptr */
            pin = input
/* output clean speech sample*/
            obuf = a1 = int(a1)
/************************************/
/*   Update Predictor Coefficients   */
/************************************/
/* if the adaptation delay */
            r18 - ADAPT_DLY
/*   isn't complete, then skip*/
            if(pl) goto noadapt r3  = ttbeta
/*   a3 = ttbeta * lastout*/
            a3  = *r3 * *r13
            r1  = spylocl
            r2  = pcloc
/*     load loop counter */
            r4  = LOOP_CNT
            r5  = pcloc pclp:       *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
            *r2++ = a0 = *r5++ + a3 * *r1++
```

```
                    *r2++ = a0 = *r5++ + a3 * *r1++
                    *r2++ = a0 = *r5++ + a3 * *r1++
                    if(r4-- >= 0) goto pclp
                    *r2++ = a0 = *r5++ + a3 * *r1++
noadapt:
```
/*******************************/
/*   Update Convergence Factor BETA */
/*******************************/

```
/*  a0 =   sigma * spyloc */
          r1  = sigma
          r2  = spyloc
          a0  = *r1 * *r2
          a2  = -a0
          a1  = a0
          a0  = ifalt(a2)

/*  _a0 = a0 + ly * (sigma - 1)*/
          r3  = ly
          r2  = sigma_1
          a0  = a0 + *r3 * *r2
          nop
/*  ly = a0*/
          *r3 = a0 = a0 r2  = py
calcly:
/*   py = ly * ly*/
          a0  = a0 * a0
/* if(py < sigma)   {py = sigma}*/
          a1  = *r1
          a3  = a0 - a1
          *r2 = a0 = ifalt(a1)

/*   ttbeta = beta/py*/
          r1  = py
          r2  = beta

/*   Divide:  *r3 = *r2/*r1*/
```

```
/* DSP32 Info. Manual, pg. 4-15*/
            r3  = ttbeta
/* move D to temp loc. */
divide: *r3 = a0 = *r1;
            r4  = dtable;
            r6  = 0x80;
            r5l = *r1;
            *r3 = r6l;
            a2  = - *r2;
            a0  = - *r3;
            a0  = ifalt(*r3);
            a2  = ifalt(*r2);
            r5  = -1 - r5;
            *r3 = a1 = *r4++;
            a0  = a0 * *r4++;
            a1  = -a0 + *r4++;
            a2  = a2 * *r4--;
            r6  = 2;
doop:       a0  = a1 * a0;
            a1  = -a0 + *r4;
            if( r6-- >= 0) goto doop;
            a2  = a1 * a2;
            *r3 = r5l;
            *r3 = a2 = *r3 * a2;
/***********************************************/
/* Test for End of Buffer --- FOR TEST FILES ONLY */
/***********************************************/
            r18 - EOF
            if(lt) goto mloop
            r18 = r18 + 1
donelp:     nop
done:       goto donelp
            nop /******************************************/
            /* Dot Product and Speech FIFO          */
            /*--------------------------------------*/
            /*   This section of code gets   */
            /* relocated at init time to high*/
```

```
            /*    memory so that memory        */
            /* accesses are interleaved for maximum*/
            /*    efficiency.         */
            /************************************/
ldot0:     r5   = zero
           a0   = *r5
           r1   = pcloc
           r2   = spyloc
           r3   = spyloc1
           r4   = 6 a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           a0 = a0 + (*r3++ = *r2++) * *r1++
           if(r4-- >= 0) goto dodot+32
           a0 = a0 + (*r3++ = *r2++) * *r1++
           goto dotdone
           nop
           nop
ldot1:     nop /*****************/
/* RAM Allocation */
/*****************/
/*         low memory RAM*/

/*    1/128*/
```

```
sigma:      float7.8125e-3
/*  sigma - 1*/
sigma_1:    float9.921875e-1
zero:       float0.0
one:        float1.0
/*    1/8000*/
window:     float1.25e-4
/*    1/1024*/
beta:       float9.765625e-4
/*    2 * beta*/
ttbeta:     float1.953125e-3
ly:         float9.0e-9
py:         float0.0
lastout:    float0.0 scratch:    float3.0
spyloc:     float0.0
spyloc1:    128 *float0.0
endtst:     float999.99
input:      float0.0
near:       float0.0, 0.0, 0.0
dtable:     float 0.0, 0.666667, 2.0, 1.333333

/*  high memory RAM (internal)*/
/*  reserve space for dotpr*/
dodot:      30  *  float0.0
pcloc:      128 *  float0.0 romend:
```

What is claimed is:

1. Apparatus for performing speech recognition in conjunction with a communication means and announcement means to decode a speech response received via said communication means to a speech message from said announcement means transmitted via said communication means, comprising:

means for adapting to said communication means in response to said message and an echo of said transmitted message only during a predefined amount of time after initiation of said message to generate parameters;

means responsive to said parameters for canceling said echo from the combination of the received speech response and said echo from said communication means to generate a modified signal; and means for recognizing said speech response from said modified signal to generate an encoded signal representing said speech response.

2. The apparatus of claim 1 wherein said predefined time is sufficient to enable said adapting means to adapt to the echo characteristics of said communication means.

3. The apparatus for performing speech recognition in conjunction with a telephone network and a telephone to respond to inquiries made by a customer via said telephone and said telephone network, comprising:

means responsive to the initiation of a telephone call via said network and said telephone to generate a first signal;

means responsive to said first signal for communicating an initial speech message to said telephone via said network;

means responsive to the initial transmission of said speech message for generating a second signal only during a predefined amount of time;

means responsive to said second signal and said initial speech message and an echo of said communicated speech message received from said network for calculating parameters to adapt to conditions causing said echo within said network;

means in response to said calculated parameters for removing said echo of said communicated speech message from the combination of the received speech response from said telephone set and said echo received from said telephone network to generate a modified signal; and means for recognizing said speech response from said modified signal to generate an encoded signal representing said speech response.

4. A method for performing speech recognition in an inquiry system have an announcement subsystem and a speech recognition subsystem in conjunction with a communication system for communicating the speech inquiries from a customer to said customer inquiry system, comprising the steps of:

transmitting a speech message from said announcement subsystem to said customer via said communication system in response to initiation of one of said speech inquiries;

adapting to said communication system in response to said transmitted message and an echo of said transmitted message only during a predefined time period to generate parameters;

canceling in response to said parameters an echo of said transmitted message from the combination of the received speech response from said customer and said echo from said communication system to generate a modified signal; and recognizing said speech response from said modified signal to generate an encoded signal representing said speech response.

5. The method of claim 4 wherein said predefined time is sufficient to enable said adapting means to adapt to the echo characteristics of said communication means.

* * * * *